US005764278A

United States Patent [19]
Nagao

[11] Patent Number: 5,764,278
[45] Date of Patent: Jun. 9, 1998

[54] VIDEO CONFERENCE APPARATUS FOR STORING A VALUE OF A PARAMETER WHEN COMMUNICATION IS TEMPORARILY DISCONNECTED

[75] Inventor: Seiji Nagao, Ebina, Japan

[73] Assignee: Ricoh Company, Ltd., Tokyo, Japan

[21] Appl. No.: 441,409

[22] Filed: May 15, 1995

[30] Foreign Application Priority Data

May 17, 1994 [JP] Japan .................................. 6-101439

[51] Int. Cl.$^6$ ..................................................... H04N 7/14
[52] U.S. Cl. ........................... 348/15; 348/17; 379/202; 379/93.21
[58] Field of Search ........................... 348/13, 14, 15, 348/17; 379/53, 54, 90, 93, 96, 97, 98, 202, 199, 93.01, 93.05, 93.17, 93.21; 364/514 A, 514 R

[56] References Cited

U.S. PATENT DOCUMENTS

| | | | |
|---|---|---|---|
| 4,893,329 | 1/1990 | O'Brien | 379/199 |
| 5,068,735 | 11/1991 | Tuchiya et al. | |
| 5,539,811 | 7/1996 | Nakamura et al. | 348/14 |
| 5,577,107 | 11/1996 | Inagaki | 379/96 |

FOREIGN PATENT DOCUMENTS

| | | |
|---|---|---|
| 3-259652 | 11/1991 | Japan . |
| 4-192657 | 7/1992 | Japan . |
| 4-248751 | 9/1992 | Japan . |
| 4-337957 | 11/1992 | Japan . |
| 6-189052 | 7/1994 | Japan . |

*Primary Examiner*—Curtis Kuntz
*Assistant Examiner*—Stephen W. Palan
*Attorney, Agent, or Firm*—Oblon, Spivak, McClelland, Maier & Neustadt, P.C.

[57] ABSTRACT

There is provided a video conference apparatus which can disconnect a communication line by a simple operation, and automatically return to a previous state when the communication line is reconnected. The video conference apparatus communicates with another video conference apparatus via a communication line so as to transmit audio and video data to permit video conferences between the apparatuses. When a temporary stop command is input, representing that the video conference currently performed is to be suspended, a present value of a parameter used for the video conference is stored. When a cancel command is input, the communication line is reconnected by using the stored value of the parameter.

25 Claims, 16 Drawing Sheets

FIG.6

| TELEPHONE NUMBER OF REMOTE TERMINAL | FIRST CHANNEL | NUMBER | 03-3333-0000 |
| --- | --- | --- | --- |
| | | SUB ADDRESS | 001 |
| | ADDITIONAL CHANNEL | NUMBER | 03-3333-0000 |
| | | SUB ADDRESS | 002 |
| BAS PARAMETER | DYNAMIC MODE | QCIF | |
| | AUDIO MODE | G.728 16 kbps | |
| | DATA | MLP 6.4 K | |
| CAMERA PARAMETER | CAMERA POSITION (x, y) = (200, 25) | | |
| | ZOOM POWER x 5 | | |
| | SHUTTER SPEED 1/60 | | |
| | CAMERA PRESET | | |
| VIDEO PARAMETER | MODE | STANDARD | |
| | PIC-IN-PIC | YES | |
| FILE PARAMETER | MATERIAL A | COORDINATE = (100, 150) | |
| | MATERIAL A (BOTH) | COORDINATE = (250, 200) | |

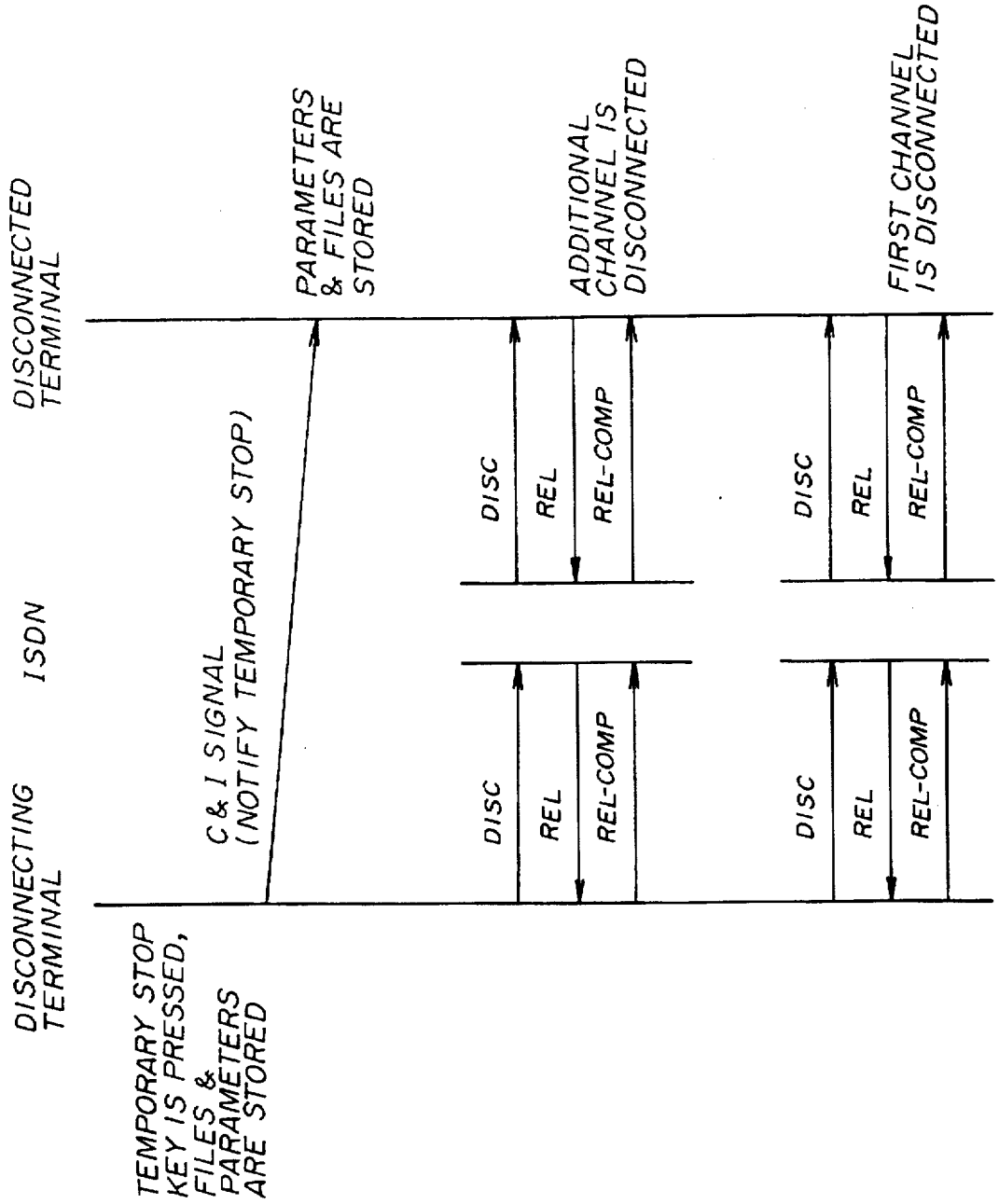

5,764,278

VIDEO CONFERENCE APPARATUS FOR STORING A VALUE OF A PARAMETER WHEN COMMUNICATION IS TEMPORARILY DISCONNECTED

BACKGROUND OF THE INVENTION (1) Field of the Invention

The present invention relates to video conference apparatuses, and more particularly to a video conference apparatus which can resume the video conference, when the video conference has been suspended, with conditions being the same as the previous conditions that existed when the video conference was stopped.

(2) Description of the Related Art

A communication conference apparatus is disclosed in Japanese Laid-Open Patent Application No. 6-189052. This communication conference apparatus retains condition information which existed immediately before an interruption of the communication line due to an unexpected cause. The communication conference apparatus executes a procedure, after the communication line is reconnected, so as to automatically return to a previous condition in accordance with the condition information. Accordingly, time and labor for reestablishing the conditions of the communication conference apparatus are eliminated when the communication line is unexpectedly interrupted.

Japanese Laid-Open Patent Application No. 4-337957 discloses an electronic conference system as a video conference apparatus. This electronic conference system stores image information displayed on a display unit in a memory while the conference is held. The image information stored in the memory can be time-sequentially displayed after the conference has ended.

Japanese Laid-Open Patent Application No. 4-192657 discloses a video telephone system. In this video telephone system, a local terminal stores a dial number of a remote terminal and image data to be sent to the remote terminal. The local terminal automatically calls the remote terminal and connects a communication line at a time set in the system beforehand. The image data stored in the local terminal is then transmitted to the remote terminal, and image data received from the remote terminal is stored in the local terminal.

Additionally, Japanese Laid-Open Patent Application No. 4-248751 discloses a video telephone system which stores telephone numbers previously dialed. The telephone numbers stored can be displayed on a monitor display when a user desires to dial one of the telephone numbers again. The desired telephone number is automatically dialed when the user designates one of the desired telephone numbers.

In the above-mentioned conventional video conference apparatuses or the like, no consideration is given for suspension of a video conference. Accordingly, a communication line for the video conference is continuously in a connected state even when the video conference is suspended for a time period or the conference is not performed with a remote party. Thus, there is a problem in that unnecessary communication cost for the video conference is incurred.

In order to eliminate the above-mentioned problem, it is suggested to temporarily disconnect a communication line of the video conference apparatuses while communication is not needed. However, when it becomes necessary to resume the video conference, the communication must be started from a reconnecting operation for the communication line. The reconnecting operation for the communication line takes an undesired or undue amount of time. Additionally, after the communication line is reconnected, the previous conditions of the video conference apparatus must be reestablished by inputting a value of each parameter. This is because the video conference apparatus is initialized when the communication line is disconnected. That is, for example, an image displayed on a monitor of the video conference apparatus when the communication line was disconnected cannot be automatically displayed when the communication line is reconnected. Accordingly, a user must perform a setting operation to return to the previous state. The setting condition is very inconvenient.

SUMMARY OF THE INVENTION

It is a general object of the present invention to provide a video conference apparatus in which the above-mentioned problems are eliminated.

A more specific object of the present invention is to provide a video conference apparatus which can disconnect a communication line by a simple operation, and automatically return to its previous operating state when the communication line is reconnected.

Another object of the present invention is to provide a video conference apparatus which can reconnect a communication line and return to a previous state by a simple operation when the communication line of the video conference apparatus is temporarily disconnected.

Another object of the present invention is to provide a video conference apparatus which can reject a call from third parties when a communication line to a remote party is temporarily disconnected.

Another object of the present invention is to provide a video conference apparatus which can cancel a temporarily disconnected state when a predetermined time has elapsed since a communication line has been disconnected.

In order to achieve the above-mentioned objects, there is provided according to the present invention a video conference apparatus connected to communicate with another video conference apparatus via a communication line so as to transmit at least audio and video data during a video conference, the video conference apparatus comprising:

first inputting means for inputting a temporary stop command to suspend the video conference currently performed;

first storing means for storing a present value of at least one parameter used for the video conference when the temporary stop command is input; and disconnecting means for disconnecting the communication line when the temporary stop command is input.

The above-mentioned video conference apparatus may further comprise:

second inputting means for inputting a cancel command which represents that the video conference currently suspended is to be resumed; and connecting means for connecting the communication line, when the cancel command is input after the communication line has been disconnected, by using the value of a parameter, the value having been stored when the temporary stop command was input.

Preferably, the video conference apparatus according to the present invention further comprises:

rejecting means for rejecting a call from a video conference apparatus other than the previously connected video conference apparatus when the communication line has been disconnected by the temporary stop command.

Additionally, the video conference apparatus according to the present invention may further comprises:

timing means for timing an elapsed time after input of the temporary stop command; and time inputting means for inputting time information which designates a period of time, the rejecting means rejecting a call from a video conference apparatus other than the previously connected video conference apparatus when the elapsed time is within the period of time.

Additionally, the video conference apparatus according to the present invention may further comprises:

second storing means for storing at least one file currently opened when the temporary stop signal is input, the file being used for performing the video conference and retrieving means for retrieving the file stored by the second storing means so that the file is automatically displayed on a display of the video conference apparatus after the communication line is reconnected.

Other objects, features and advantages of the present invention will become more apparent from the following detailed description when read in conjunction with the accompanying drawings.

BRIEF DESCRIPTION OF THE DRAWINGS

FIG. 6 is a chart showing files and parameters to be stored when a video conference is temporarily stopped;

FIG. 7 is a chart showing a protocol sequence performed in the first embodiment of the video conference apparatus shown in FIG. 1;

DETAILED DESCRIPTION OF THE PREFERRED EMBODIMENTS

Figure 1:
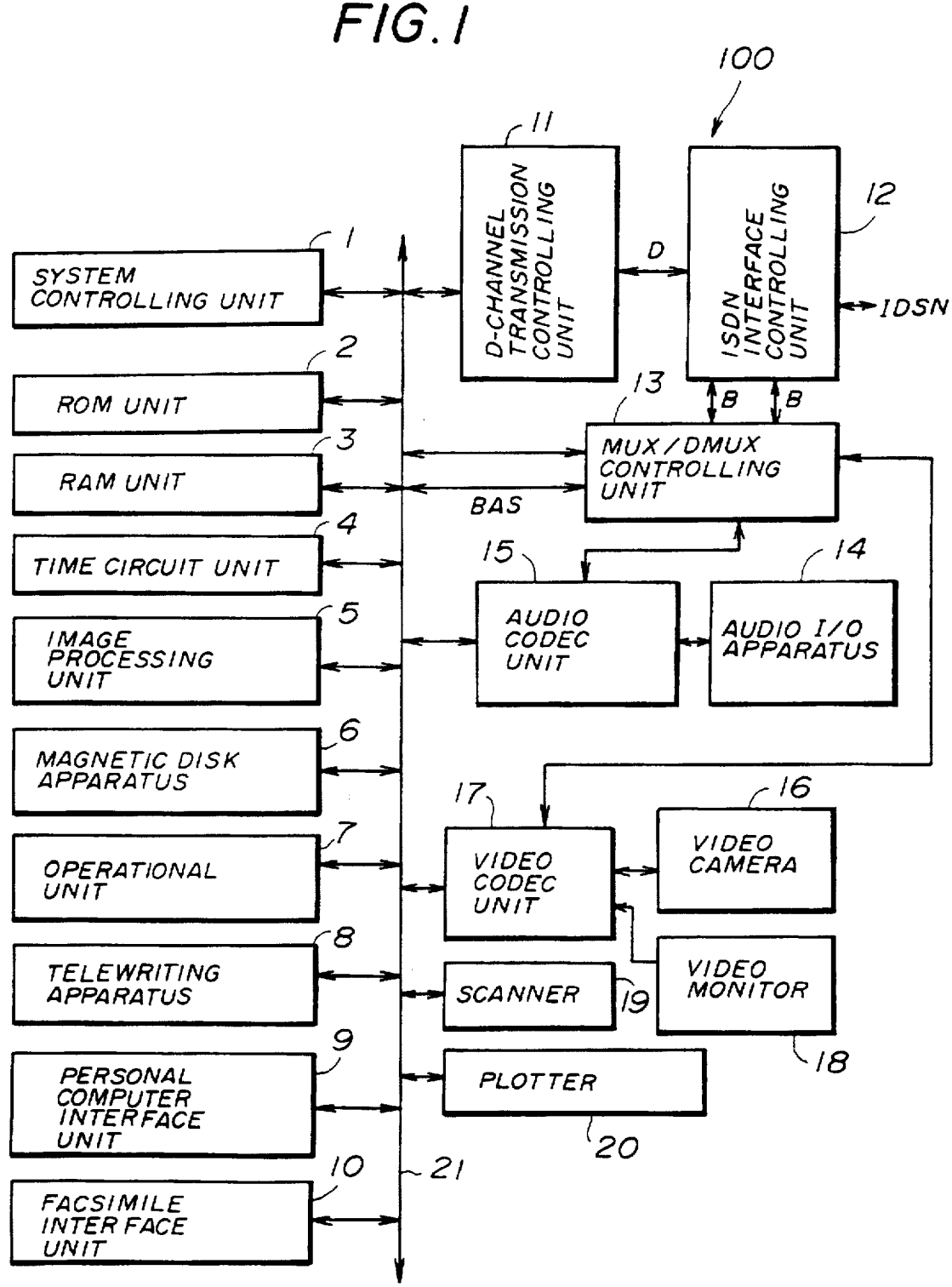
FIG. 1 is a block diagram of a first embodiment of a video conference apparatus according to the present invention.

A description will now be given, with reference to FIG. 1, of a first embodiment of a video conference apparatus according to the present invention. FIG. 1 is a block diagram of the first embodiment of the video conference apparatus according to the present invention.

A video conference apparatus 100 shown in FIG. 1 is in accordance with the International Telecommunication Union (ITU) Recommendation H.320, and adapted to use the Integrated Service Digital Network (ISDN) as a communication line. A telewriting apparatus and a facsimile apparatus can be connected to the video conference apparatus 100 so that video conference can be performed smoothly by using document information.

In FIG. 1, a system controlling unit 1 controls each part of the video conference apparatus 100 according to control programs, bit map information and various sets of data stored in a read only memory (ROM) unit 2 and a magnetic disk apparatus 6. A random access memory (RAM) unit 3 comprises a RAM and a static random access memory (SRAM). The RAM temporarily stores control programs or system parameters retrieved from a work area of the system controlling unit 1 or the magnetic disk apparatus 6. The SRAM is provided with a backup circuit including a battery so as to retain data after power is turned off.

A time circuit unit 4 outputs time information and has a timer function. An image processing unit 5 compresses and extends a facsimile image according to the Modified Read (MR) method or the Modified Modified Read (MMR) method.

The magnetic disk apparatus 6 stores various sets of data such as program data including control programs and application programs executed in the system controlling unit 1, and various data files including document data and video information used in conference. An operational unit 7 is provided for inputting operation commands to operate the video conference apparatus 100.

A telewriting apparatus 8 comprises a liquid crystal display (LCD) and a touch panel so as to provide a telewriting function to the user by displaying information including a facsimile message sent from a remote party. A personal computer interface unit 9 interfaces various personal computers to be connected to the video conference apparatus 100. A facsimile interface unit 10 interfaces a G3/G4 facsimile connected to the video conference apparatus 100.

A D-channel transmission controlling unit 11 controls a signal channel by using a D-channel in accordance with a call control procedure. An ISDN interface controlling unit 12 connects the video conference apparatus 100 to ISDN, and processes signals in the layer 1. The ISDN interface controlling unit 12 also multiplexes/demultiplexes signals on the D-channel and two B-channels.

A multiplex/demultiplex (MUX/DMUX) controlling unit 13 is connected to the ISDN interface controlling unit 12 on the multiplex side by using the two B-channels. The MUX/DMUX controlling unit 13 is also connected to bus lines on the demultiplex side which bus lines input/output digital audio data, digital video data and general data. The MUX/DMUX controlling unit 13 controls the two B-channels according to the ITU Recommendation H.221, and also controls multiplexing/demultiplexing of various sets of media data and a synchronization of data frame.

An audio input/output (I/O) apparatus 14 comprises a microphone and a speaker so as to provide verbal communication between a local party and a remote party. An audio CODEC unit 15 converts analog audio signals input from the audio I/O apparatus 14 into digital audio signals in accordance with an encoding method according to the ITU Recommendation G.711, G.722 or G.728. The audio CODEC unit 15 also converts digital audio signals into analog audio signals, and outputs them to the audio I/O apparatus 14.

A video camera 16 takes a picture of a conference or a document according to the NTSC method, and outputs video signals to a video CODEC unit 17. The video CODEC unit 17 converts the video signals into digital video signals, and produces video information by encoding and compressing the digital video signals in accordance with the ITU Recommendation H.261. The video information is converted into video data in an original common intermediate format (CIF) or a quarter common intermediate format (QCIF). The video data is converted into analog video data, and the analog video data is further converted into video signals according to the NTSC method. The video CODEC unit 17 also transfers the digital video signal, which is converted from analog video signal input from the video camera, to the magnetic disk apparatus 6 and the multiplex/demultiplex controlling unit 13 in accordance with the joint photographic experts group (JPEG) method. The video CODEC unit 17 decodes static image data input from the magnetic disk apparatus 6 or the multiplex/demultiplex controlling unit 13 in accordance with the JPEG method, and converts the encoded data into analog signals to output them to a video monitor 18.

The video monitor 18 displays an image in accordance with the video signals encoded by the video CODEC unit 17. The video monitor 18 can display an image taken by the video camera 16 provided in the same terminal in a picture-in-picture mode.

A scanner 19 scans an original document to produce image data. A plotter 20 prints out a document or an original document received from the remote party.

A system bus 21 connects each unit of the video conference apparatus 100 to transmit various sets of data and control information.

Figure 2:
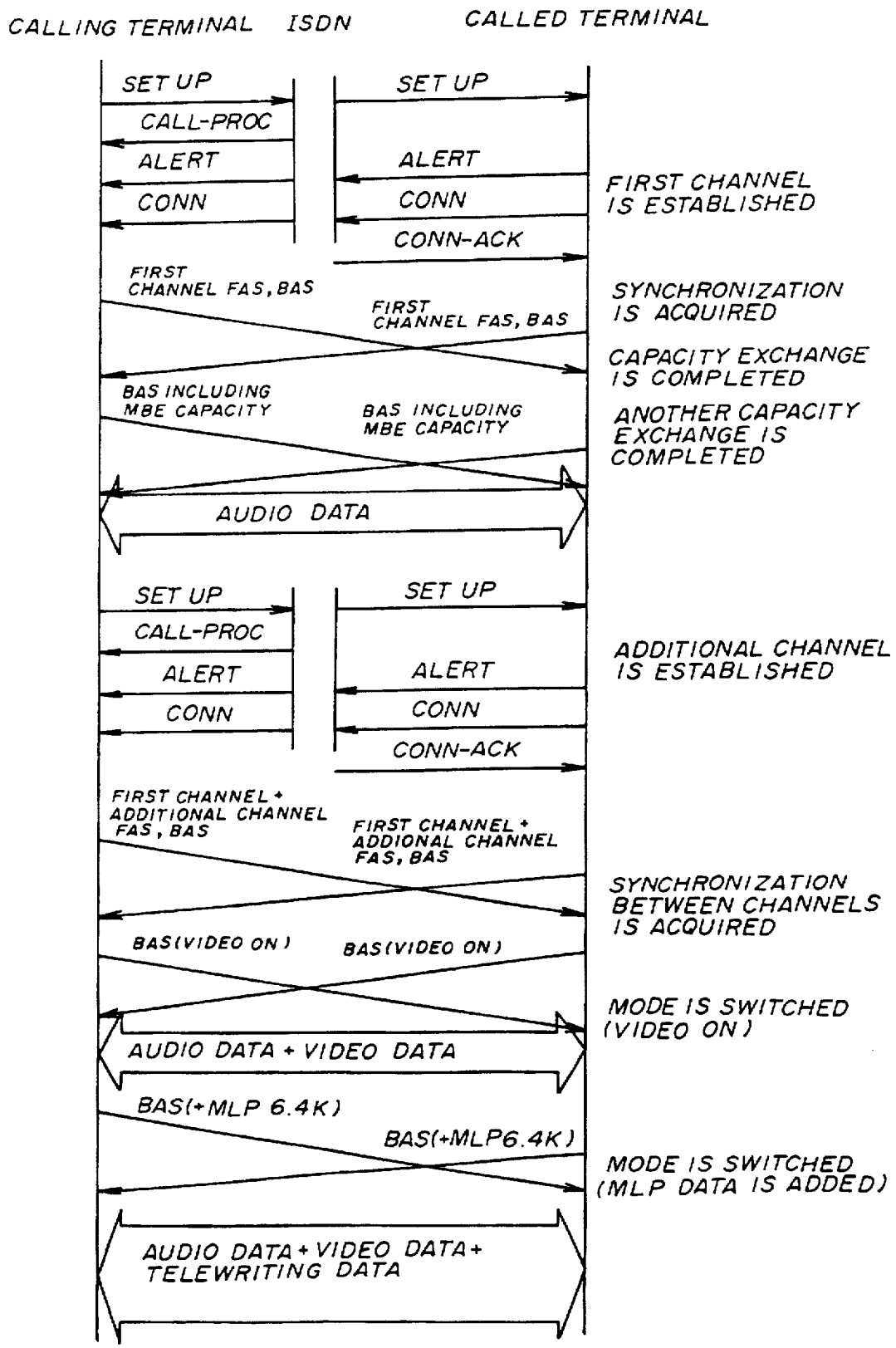
FIG. 2 is a chart showing a protocol sequence performed in the video conference apparatus shown in FIG. 1.

A description will now be given, with reference to FIG. 2, of a protocol sequence for connecting a communication line which protocol sequence is executed in communication performed by the video conference apparatus 100 shown in FIG. 1. FIG. 2 is a chart showing the protocol sequence for connecting a communication line which protocol sequence is executed in communication performed by the video conference apparatus 100 shown in FIG. 1.

Referring to FIG. 2, a telephone number (calling number) of a remote terminal (a called terminal) is input through the operational unit 7 of a local terminal (a calling terminal) so as to input the calling number in the D-channel transmission controlling unit 11. The D-channel transmission controlling unit 11 sets the calling number in a call setup message SETUP, and then outputs SETUP to ISDN to request a setup of a connection to the remote terminal. ISDN sends a call proceeding message CALL-PROC, after receiving SETUP, to the local terminal, and at the same time sends SETUP to the remote terminal.

The remote terminal sends, after receiving SETUP, an alert message ALERT to ISDN. ISDN then sends ALERT, after receiving the ALERT from ISDN, to the local terminal so as to notify the local terminal that the remote terminal is called.

The remote terminal sends an answer message CONN to ISDN as an answer back to the call from the local terminal. ISDN sends CONN, after receiving CONN from the remote terminal, to the local terminal, and at the same time sends a connect acknowledge message CONN-ACK to the remote terminal. At this time, an information channel (B-channel) is established as a first channel which transmits data between the local terminal and the remote terminal.

Thereafter, the MUX/DMUX controlling unit 13 of each of the local and remote terminals acquire a frame alignment for the first channel by means of a frame alignment signal FAS in which A PCM audio data of 64 Kbps is set in accordance with an audio signal encoding capability of A-law or μ-law. After the frame alignment is acquired by the frame alignment signal FAS, a capacity bit-rate allocation signal (a capacity BAS) and a command bit-rate allocation signal (a command BAS) are exchanged so as to establish an additional channel.

If it is determined that the BAS has a multiple-bytes extension message processing capability (MBE capability) when the capacity BAS is exchanged, the MUX/DMUX controlling unit 13 of each of the local and remote terminals performs another capacity exchange so as to use an independent capacity in main communication. After following the above-mentioned procedure, audio data communication can be performed between the local and remote terminals.

The local terminal then establishes the additional channel to transmit video data. The local terminal inputs a number (a calling number) of the remote terminal to the D-channel transmission controlling unit 11. This calling number may be the calling number used when the first channel is established or may be a different calling number. The D-channel transmission controlling unit 11 then sets the calling number in a call setup message SETUP, and then outputs SETUP to ISDN to request a setup of a connection to the remote terminal. ISDN sends, after receiving SETUP, a call proceeding message CALL-PROC to the local terminal, and at the same time sends SETUP to the remote terminal.

The remote terminal sends, after receiving SETUP, an alert message ALERT to ISDN. ISDN then sends ALERT, after receiving ALERT from ISDN, to the local terminal so as to notify the local terminal that the remote terminal is called.

The remote terminal sends an answer message CONN to ISDN as an answer back to the call. ISDN sends CONN, after receiving CONN from the remote terminal, to the local terminal, and at the same time sends a connect acknowledge message CONN-ACK to the remote terminal. At this time, an information channel (B-channel) is established as the additional channel which transmits data between the local terminal and the remote terminal. After the additional channel is established, FAS and BAS are exchanged between the local and remote terminals similarly to that performed for the first channel in accordance with a framing format suggested in ITU Recommendation H.221. After a multi-frame alignment for the additional channel is established, a synchronization between the first channel and the additional channel is acquired.

After the synchronization between the two information channels is acquired, the MUX/DMUX controlling unit 13 of the local terminal sends a BAS command which designates "video on" to the remote terminal. An exchange of audio data and video data can be started between the local and remote terminals so as to start a session for a basic video conference.

In this state, if a user desire to perform telewriting communication during the video conference, a mode switching is performed by adding 6.4 KbpsMLP to the BAS command so as to connect a data path for transmitting telewriting data. By following the above-mentioned procedures, communication for audio data, video data arid telewriting data can be performed between the local and remote terminals.

Figure 3:
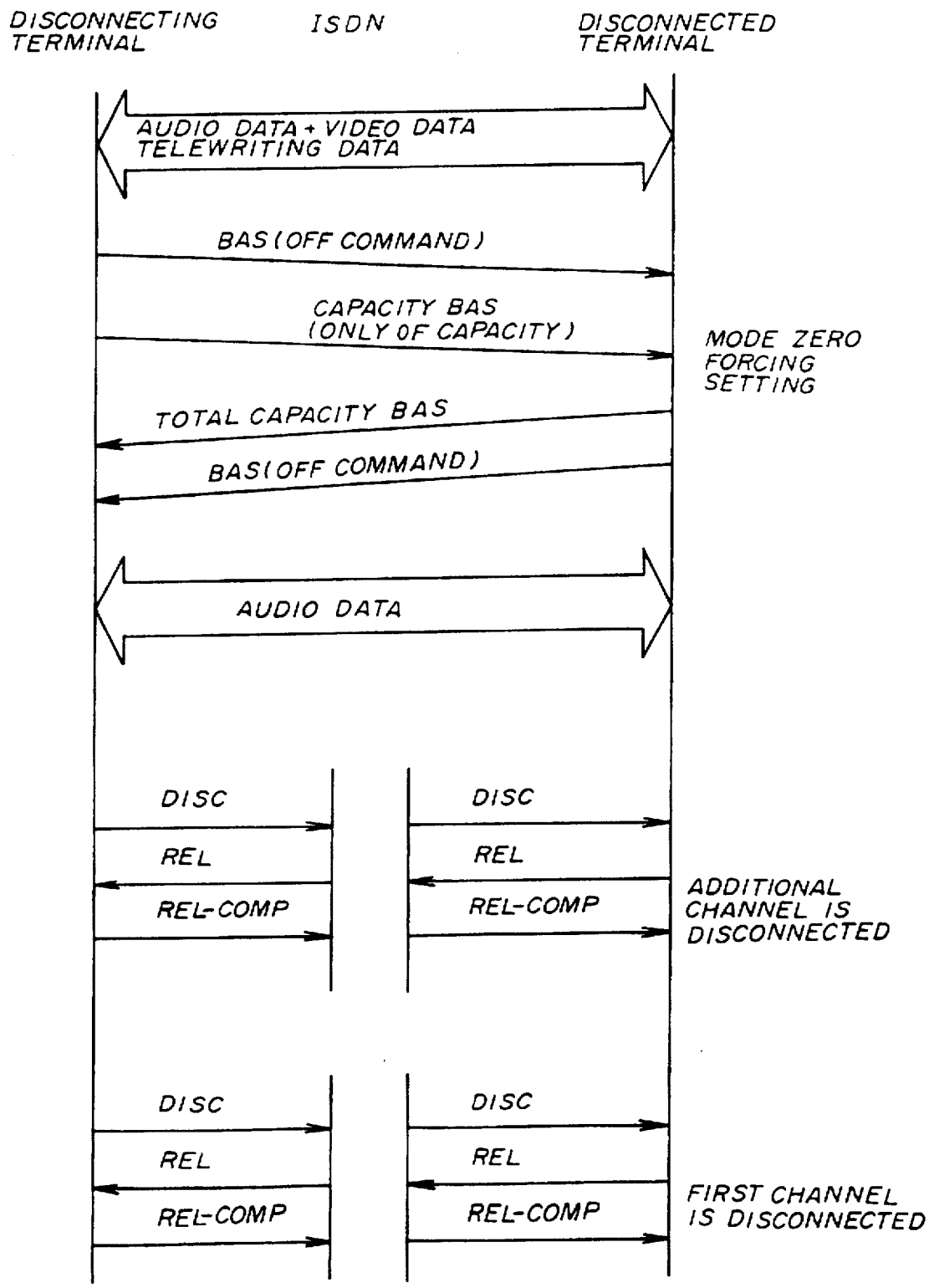
FIG. 3 is a chart showing a protocol sequence performed in a first embodiment of the video conference apparatus shown in FIG. 1.

A description will now be given, with reference to FIG. 3, of a protocol sequence for disconnecting a communication line performed by the video conference apparatus 100 shown in FIG. 1. FIG. 3 is a chart showing a protocol sequence for disconnecting a communication line performed by the video conference apparatus 100.

Referring to FIG. 3, communication for audio data, video data and telewriting data is performed between the local and remote terminals. In this case, either one of the local and remote terminals can disconnect the communication line. In FIG. 3, the local terminal (herein after called a disconnecting terminal) disconnects the communication line between the local terminal and the remote terminal (hereinafter called a disconnected terminal). Disconnection of the communication line is started by pressing a temporary stop key (shown in FIG. 4) provided on the operational unit 7.

When the temporary stop key of the operational unit 7 of the disconnecting terminal is pressed, the disconnecting terminal performs a mode zero forcing setting so as to be in a state in which only 0F (PCM audio data) is present. More specifically, the disconnecting terminal sends a 0F BAS command to the disconnected terminal, and then sends a 0F capacity BAS. When the disconnected terminal receives the 0F BAS command and 0F capacity command, the disconnected terminal sends a total capacity BAS command and then sends a 0F BAS command to the disconnecting terminal so as to set a state in which audio communication of 0F can be performed. By following the above procedures, only communication for audio data can be performed between the disconnecting and disconnected terminals.

After the mode zero forcing setting is completed, the disconnecting terminal sends a disconnecting message DISC to ISDN. ISDN sends DISC, after receiving DISC from the disconnecting terminal, to the disconnected terminal. The disconnected terminal sends, after receiving DISC, a release message REL to ISDN. ISDN sends REL, after receiving REL from the disconnected terminal, to the disconnecting terminal. The disconnecting terminal sends a release complete message REL-COMP, after receiving REL from ISDN, to ISDN. ISDN sends REL-COMP, after receiving REL-COMP from the disconnecting terminal, to the disconnected terminal, and then disconnects the additional channel which is no longer transmitting media data.

The first channel is then disconnected by similar procedures, and thus the communication line between the local and remote terminals is completely disconnected.

Figure 4:
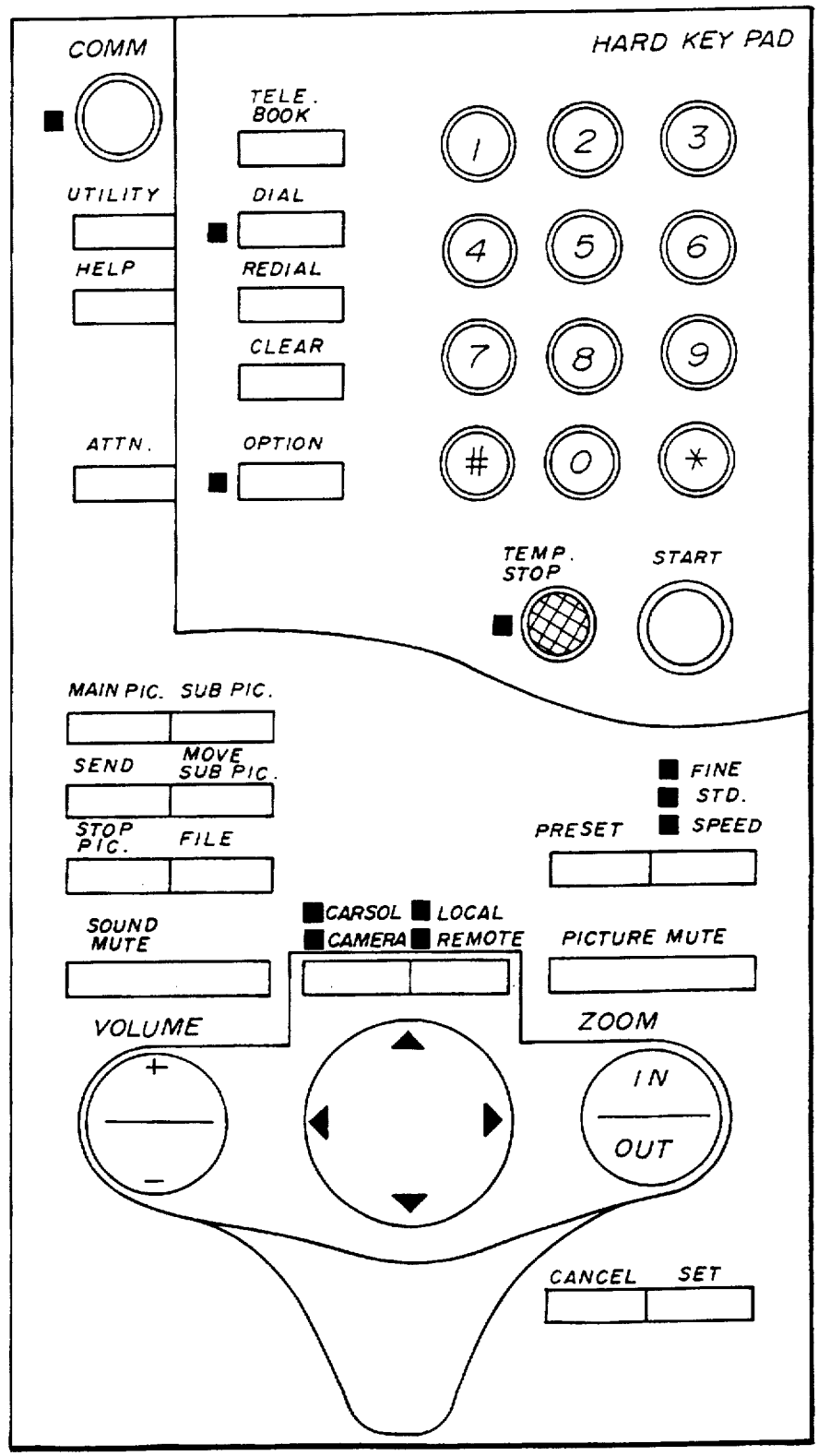
FIG. 4 is a plan view of an operational unit provided in the video conference apparatus shown in FIG. 1.

FIG. 4 is a plan view of the operational unit 7 provided in the video conference apparatus 100 shown in FIG. 1. As shown in FIG. 4, the operational unit 7 comprises various keys including the above-mentioned stop key used for temporarily stopping the video conference. The communication line is disconnected by a simple pressing operation of the temporary stop key.

Figure 5:
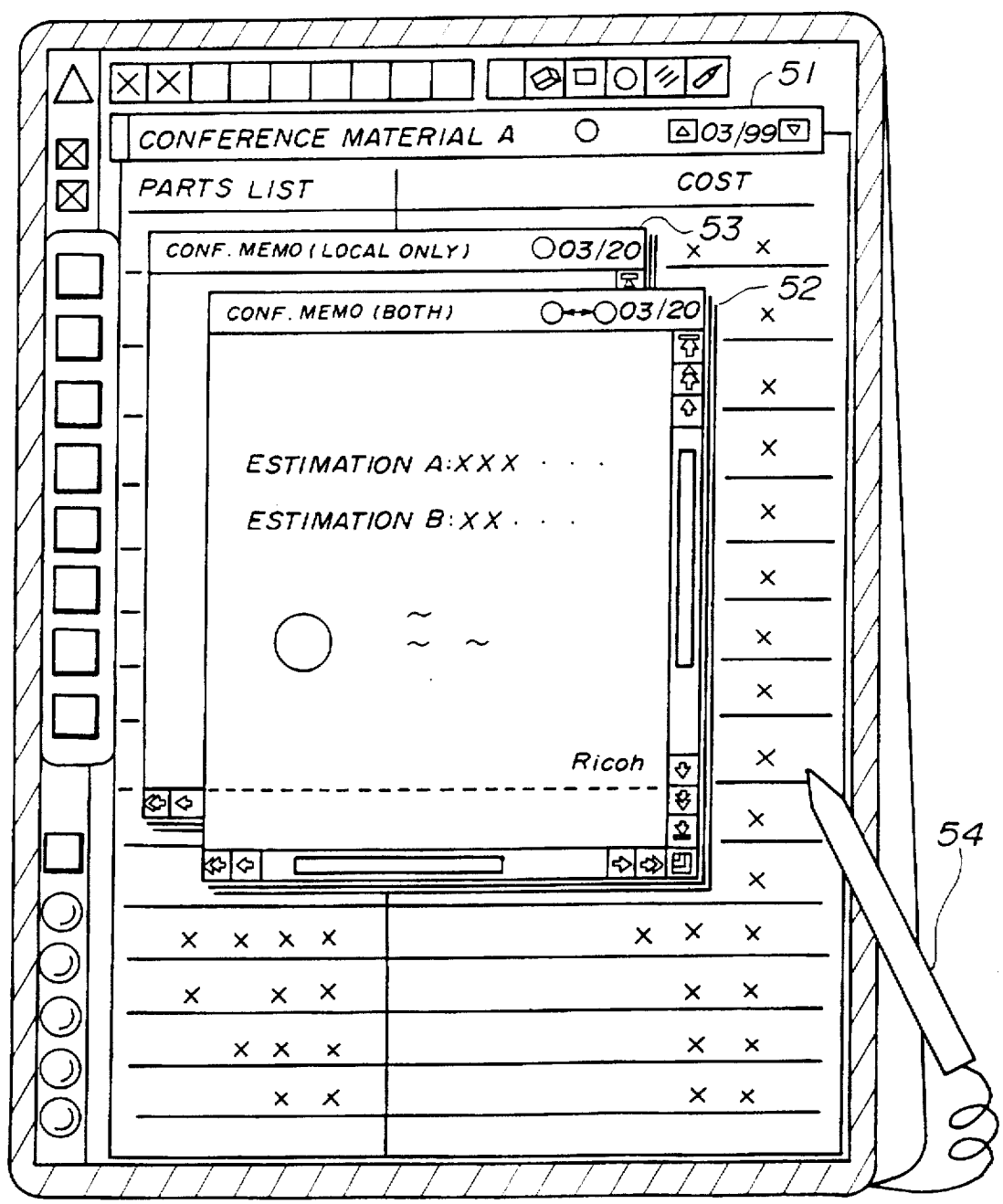
FIG. 5 is a plan view of a telewriting apparatus provided in the video conference apparatus shown in FIG. 1.

FIG. 5 is a plan view of the telewriting apparatus 8 provided in the video conference apparatus 100 shown in FIG. 1. The telewriting apparatus 8 is provided to perform telewriting communication. As shown in FIG. 5, a touch pen is 54 is provided with the telewriting apparatus 8. A file of conference material (for example material A) 51 can be opened by using the touch pen 54. Additionally, words and pictures can be written in memorandums 53 and 54 by hand writing. The memorandum 52 is displayed on the telewriting apparatus 8 of each of the remote and local terminals. The memorandum 53 is displayed only on the telewriting apparatus 8 of the local terminal.

FIG. 6 is a chart showing files and parameters to be stored when the video conference is temporarily stopped.

In FIG. 6, the telephone numbers of the remote terminal are stored in the RAM unit 3 for calling the remote terminal when the video conference is resumed. The telephone number includes the number for the first channel and the number for the additional channel. BAS parameters are also store in the RAM unit 3. The BAS parameters are sent and received by the MUX/DMUX controlling units 13 immediately before the stop key of the operational unit 7 is pressed, that is, the video conference is temporarily stopped. Camera parameters are also stored in the RAM unit 3. The camera parameters are set in the video CODEC unit 17. The camera parameters includes camera position, a zoom power, a shutter speed and a camera preset. Additionally, file parameters are stored in the RAM unit 3. The file parameters includes materials and memorandums which were displayed on the telewriting apparatus 8. Coordinate values of the materials and memorandums on the telewriting apparatus 8 are stored together with the file parameters.

A description will now be given, with reference to FIG. 7, a protocol sequence for temporarily disconnecting a communication line. FIG. 7 is a chart showing a protocol sequence for temporarily stopping the video conference operation performed by the video conference apparatus shown in FIG. 1.

It is assumed that the video conference is to be temporarily stopped for some reason. In this case, either one of the local and remote terminals can disconnect the communication line. In FIG. 7, the local terminal (herein after referred to as a disconnecting terminal) disconnects the communication line between the local terminal and the remote terminal (hereinafter referred to as a disconnected terminal). Disconnection of the communication line is performed by pressing a temporary stop key (shown in FIG. 4) provided on the operational unit 7.

When the stop key of the operational unit 7 of the disconnecting terminal is pressed, the disconnecting terminal notifies the disconnected terminal that the video conference is temporarily stopped by sending a control and indication (C&I) signal to the disconnected terminal. The C&I signal may be in the form of a BAS command. After that, the disconnecting terminal stores files and parameters on the disconnecting terminal side. The disconnected terminal also stores, after receiving the C&I signal, files and parameters on the disconnected terminal side.

The disconnecting terminal then sends a disconnecting message DISC to ISDN. ISDN sends DISC, after receiving DISC from the disconnecting terminal, to the disconnected terminal. The disconnected terminal sends, after receiving DISC, a release message REL to ISDN. ISDN sends REL, after receiving REL from the disconnected terminal, to the disconnecting terminal. The disconnecting terminal sends a release complete message REL-COMP, after receiving REL from ISDN, to ISDN. ISDN sends REL-COMP, after receiving REL-COMP from the disconnecting terminal, to the disconnected terminal, and then disconnects the additional channel which is no longer transmitting media data.

The first channel is then disconnected by similar procedures, and thus the communication line between the local and remote terminals is completely disconnected.

Figure 8:
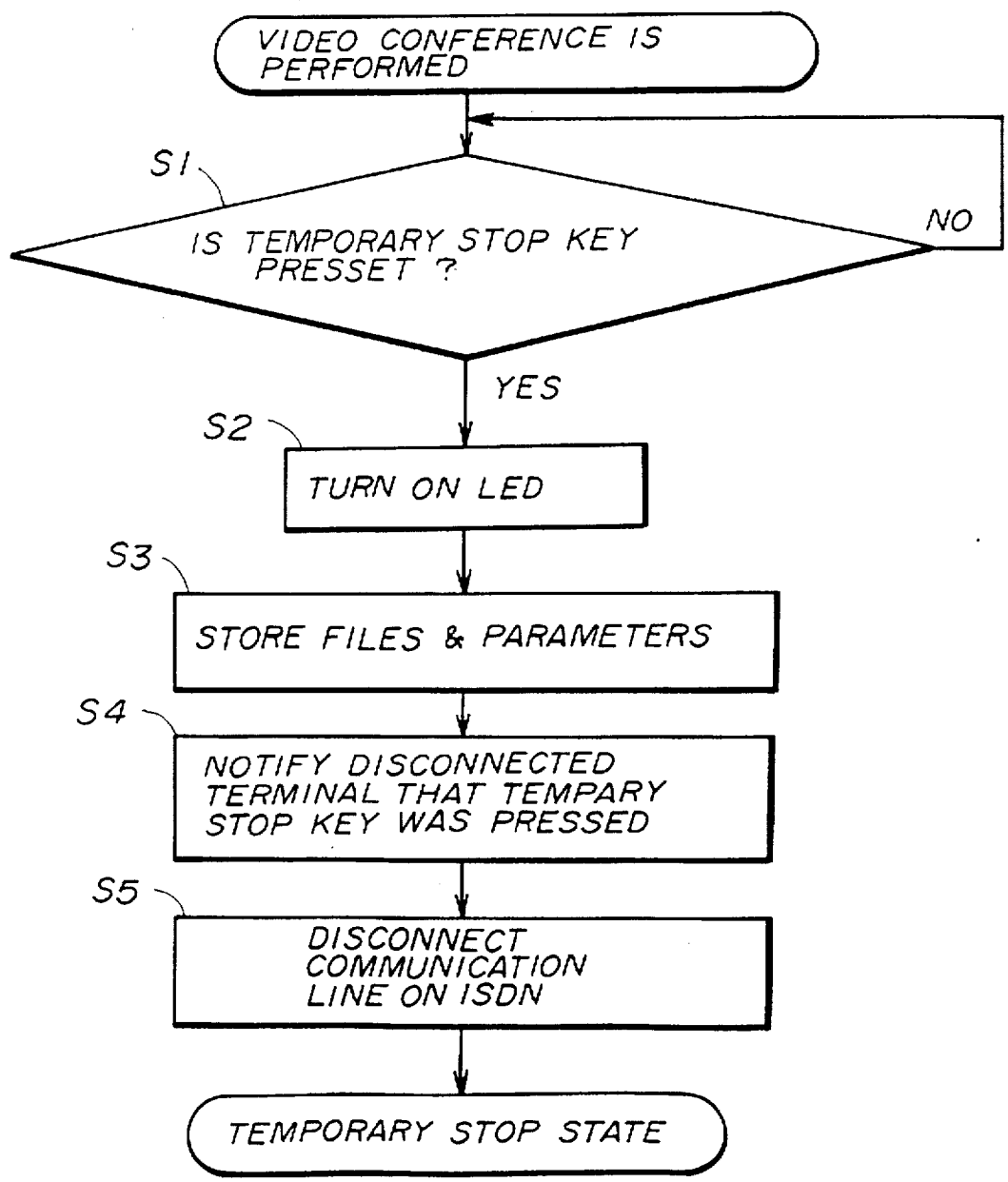
FIG. 8 is a flowchart of an operation performed by a disconnecting terminal of the first embodiment when a communication line is temporarily disconnected.

FIG. 8 is a flowchart of an operation performed by the disconnecting terminal when a communication line is temporarily disconnected.

While the video conference is performed between the local and remote terminals, it is determined in step 1 (hereinafter "step" is abbreviated as "S") whether or not the temporary stop key is pressed. The temporary stop key may be pressed on either side of the local and remote terminals. Hereinafter the terminal of which temporary stop key is pressed is referred to as the disconnecting terminal, and the opposite terminal is referred to as the disconnecting terminal.

If it is determined in S1 that the temporary stop key of the disconnecting terminal is pressed, an LED adjacent to the temporary stop key is turned on, in S2, so as to indicate that the system enters a temporary stop state. In S3, files which are currently open are then closed and stored in the magnetic disk apparatus 6, and values of parameters which are currently used are stored in the RAM unit 3. The system controlling unit 1 of the disconnecting terminal then notifies the disconnecting terminal, in S4, that the temporary stop key is pressed on the disconnecting side by using a C&I signal which is transmitted through the MUX/DMUX controlling unit 13 and ISDN. The C&I signal may be in the form of a BAS command. The system controlling unit 1 then disconnects, in S5, a communication line on ISDN by D-channel controlling unit 11 and the ISDN interface controlling unit 12, and thus the disconnecting terminal enters the temporary stop state.

Figure 9:
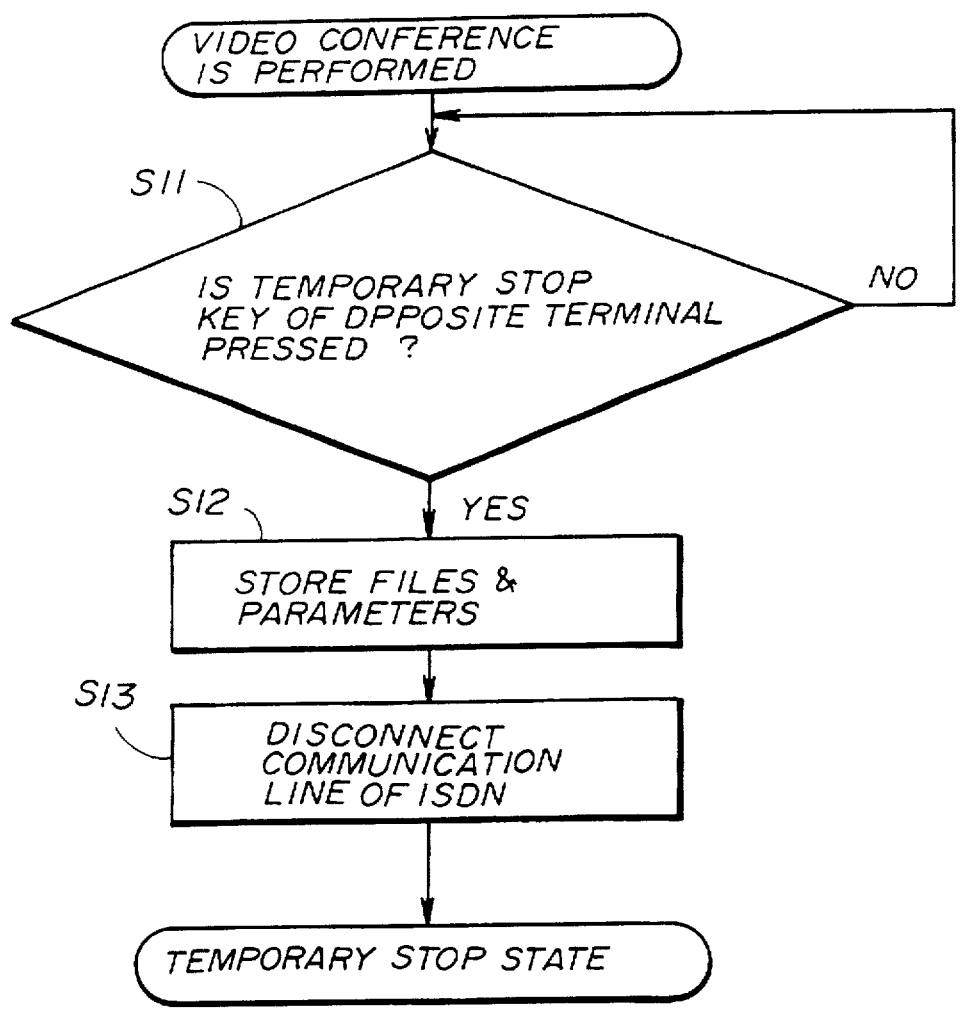
FIG. 9 is a flowchart of an operation performed by a disconnected terminal of the first embodiment when a communication line is temporarily disconnected.

FIG. 9 is a flowchart of an operation performed by the disconnected terminal when the communication line is temporarily disconnected.

When the user of the disconnecting side presses the temporary stop key, the C&I signal (BAS command) indicating the fact that the temporary stop key is pressed is sent from the disconnecting apparatus to the disconnected apparatus. Accordingly, in the disconnected apparatus, it is determined in S11 whether or not the C&I signal indicating that the temporary stop key is pressed is received from the disconnecting apparatus. If it is determined in S11 that the temporary stop key is pressed, files which are currently open are then closed and stored, in S12, in the magnetic disk apparatus 6, and values of parameters which are currently used are stored in the RAM unit 3. The system controlling unit 1 then disconnects, in S13, the communication line of ISDN by D-channel controlling unit 11 and the ISDN interface controlling unit 12, and thus the disconnected terminal enters in the temporary stop state.

In the above-mentioned operation, since files and parameters used when the video conference is temporary stopped are automatically stored, the disconnecting and disconnected terminals can return, when the temporary stop state is canceled, to the state which existed before the communication line was disconnected in a short time without inputting operations for the files and parameters.

A description will now be given of a second embodiment of the video conference apparatus according to the present invention. The hardware structure of the second embodiment is the same as that of the above-mentioned first embodiment shown in FIG. 1, and thus descriptions of parts of the second embodiment that are the same as the parts shown in FIG. 1 will be omitted.

Figure 10:
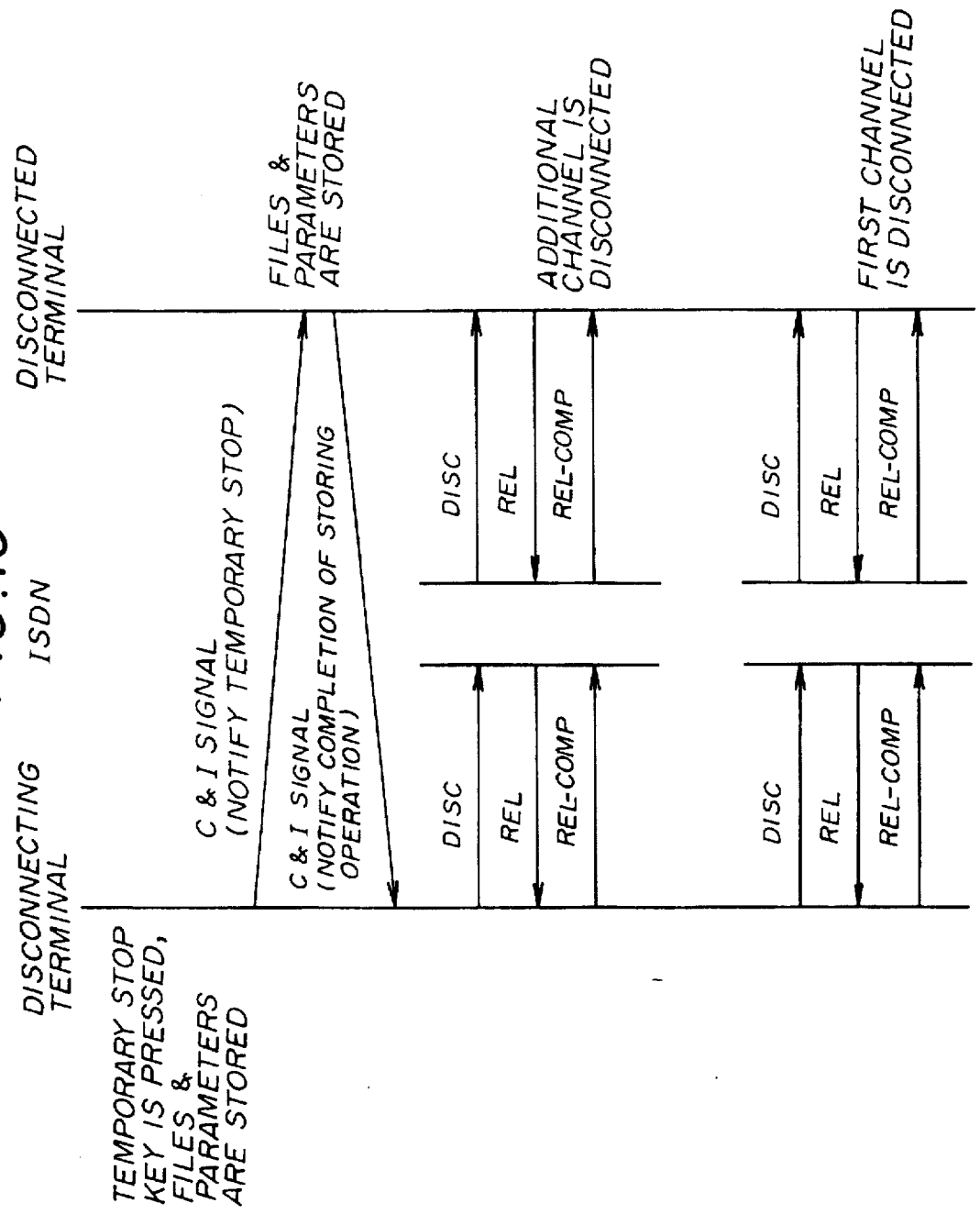
FIG. 10 is a chart showing a protocol sequence performed in a second embodiment of the video conference apparatus according to the present invention.

FIG. 10 is a chart showing a protocol sequence of the second embodiment of the video conference apparatus according to the present invention when a communication line is temporarily stopped.

In FIG. 10, when a temporary stop key of the disconnecting terminal is pressed, a disconnecting terminal sends a C&I signal to a disconnected terminal so as to notify the disconnected terminal the fact that the temporary stop key is pressed. The C&I signal may be in the form of a BAS command. At the same time the disconnecting terminal stores files and parameters currently used in the disconnecting terminal. The disconnected terminal also stores files and parameters currently used in the disconnected terminal after receiving the C&I signal from the disconnecting terminal, and then sends another C&I signal which indicates that a storing operation is completed and thus a disconnecting operation of the communication line can be preformed.

The disconnecting terminal then sends a disconnecting message DISC to ISDN. ISDN sends DISC, after receiving DISC from the disconnecting terminal, to the disconnected terminal. The disconnected terminal sends, after receiving DISC, a release message REL to ISDN. ISDN sends REL, after receiving REL from the disconnected terminal, to the disconnecting terminal. The disconnecting terminal sends a release complete message REL-COMP, after receiving REL from ISDN, to ISDN. ISDN sends REL-COMP, after receiving REL-COMP from the disconnecting terminal, to the disconnected terminal, and then disconnects the additional channel which is no longer transmitting media data.

The first channel is then disconnected by similar procedures, and thus the communication line between the local and remote terminals is completely disconnected.

While a video conference is being performed between the local and remote terminals, it is determined whether or not the temporary stop key is to be actuated. The temporary stop key may be pressed on either side of the local and remote terminals. Hereinafter, the terminal provided with the actuated temporary stop key is referred to as the disconnecting terminal, and the opposite terminal is referred to as the disconnected terminal.

Figure 11:
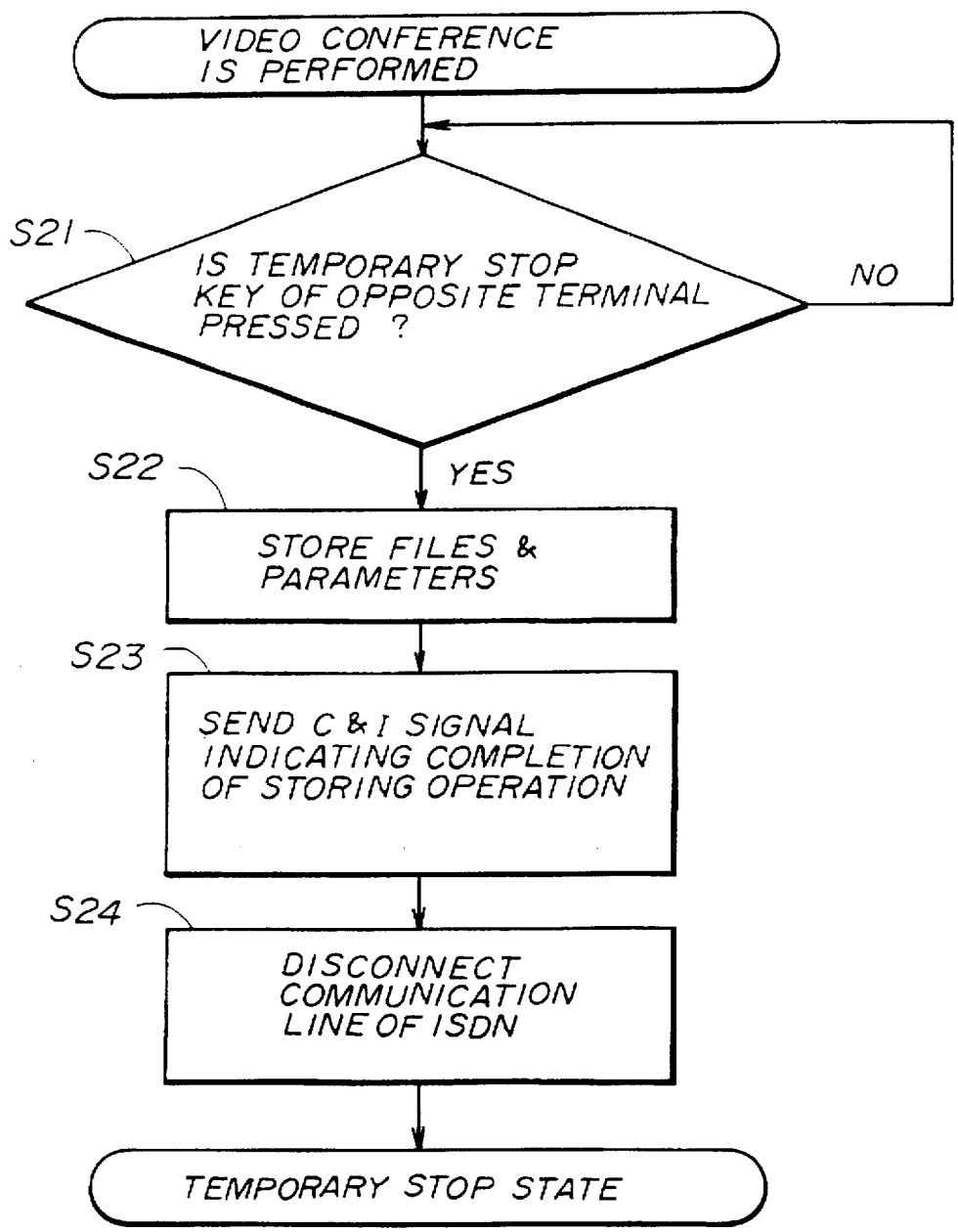
FIG. 11 is a flowchart of an operation performed by the disconnected terminal of the second embodiment when a communication line is temporarily disconnected.

FIG. 11 is a flowchart of an operation performed by the disconnected terminal when a communication line is temporarily disconnected.

When the user of the disconnecting side presses the temporary stop key, a C&I signal (BAS command) indicating the fact that the temporary stop key is pressed is sent from the disconnecting apparatus to the disconnected apparatus. Accordingly, in the disconnected apparatus, it is determined in S21 whether or not the C&I signal indicating that the temporary stop key is pressed is received from the disconnecting apparatus. If it is determined in S21 that the temporary stop key is pressed, files which are currently open are then closed and stored, in S22, in the magnetic disk apparatus 6, and values of parameters which are currently used are stored in the RAM unit 3. The system controlling unit 1 of the disconnected terminal sends to the disconnecting terminal, in S23, the C&I signal indicating that the storing operation of the files and parameters is completed, and thus a disconnecting operation of the communication line can be performed. The system controlling unit 1 of the disconnected terminal then disconnects, in S24, the communication line of ISDN by D-channel controlling unit 11 and the ISDN interface controlling unit 12, and thus the disconnected terminal enters in the temporary stop state.

Figure 12:
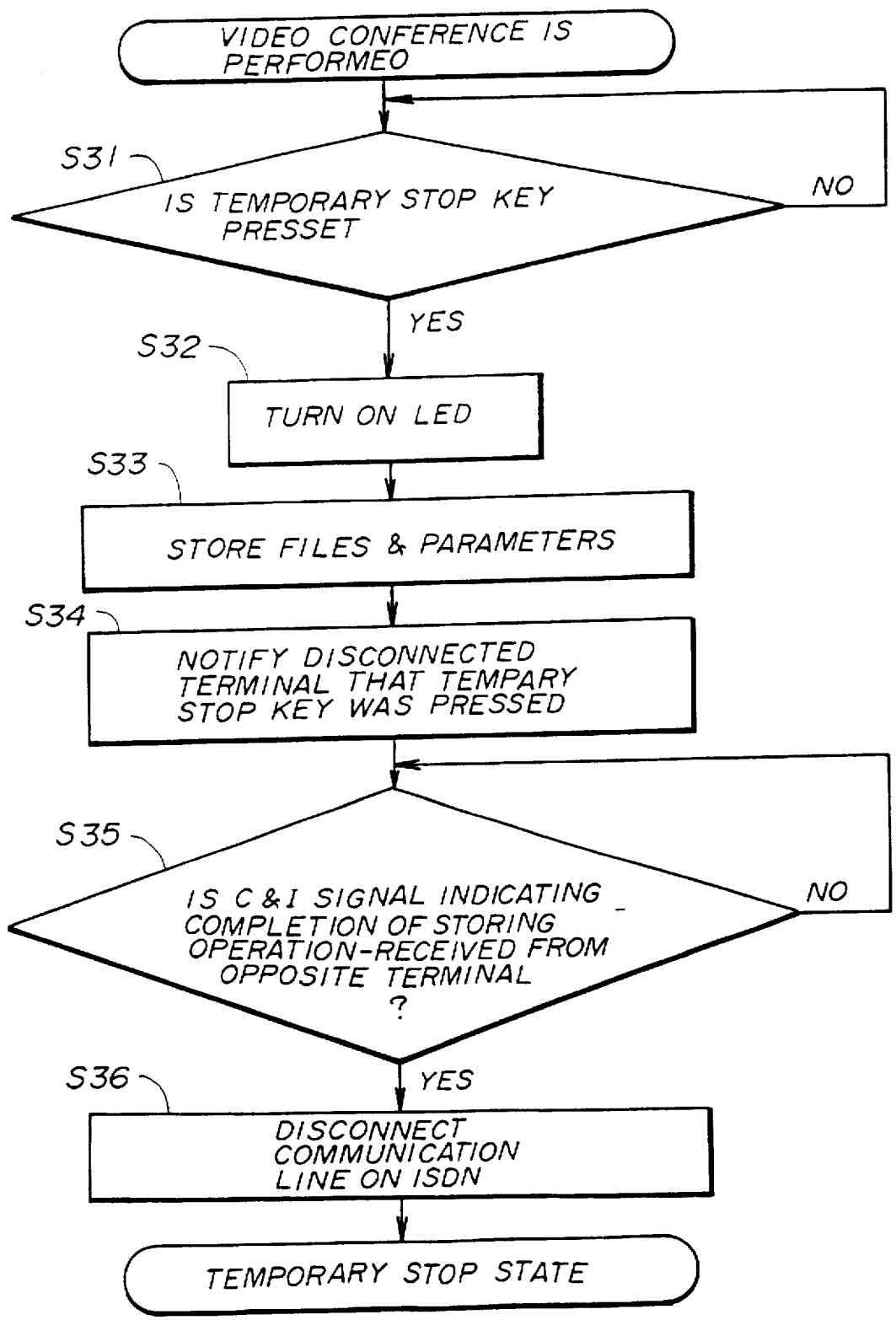
FIG. 12 is a flowchart of an operation performed by the disconnecting terminal of the second embodiment when a communication line is temporarily disconnected.

FIG. 12 is a flowchart of an operation performed by the disconnecting terminal when a communication line is temporarily disconnected.

If it is determined in S31 that the temporary stop key of the disconnecting terminal is pressed, an LED adjacent to the temporary stop key is turned on, in S32, so as to indicate that the system has entered a temporary stop state. In S33, files which are currently open are then closed and stored in the magnetic disk apparatus 6, and values of parameters which are currently used are stored in the RAM unit 3. The system controlling unit 1 of the disconnecting terminal then notifies, in S34, the disconnected terminal that the temporary stop key is pressed on the disconnecting side by using a C&I signal which is transmitted through the MUX/DMUX controlling unit 13 and ISDN. The C&I signal may be in the form of a BAS command.

It is then determined, in S35, whether or not the C&I signal indicating the completion of the storing operation of the files and parameters is received from the disconnected terminal. If it is determined that the C&I signal is received, the routine proceeds to S36 in which the system controlling unit 1 disconnects a communication line on ISDN by D-channel controlling unit 11 and the ISDN interface controlling unit 12, and thus the disconnecting terminal enters in the temporary stop state. That is, the disconnecting terminal waits a disconnection of the communication line until the C&I signal, which indicates the completion of the storing operation on the disconnected terminal side is completed, is received.

Figure 13:
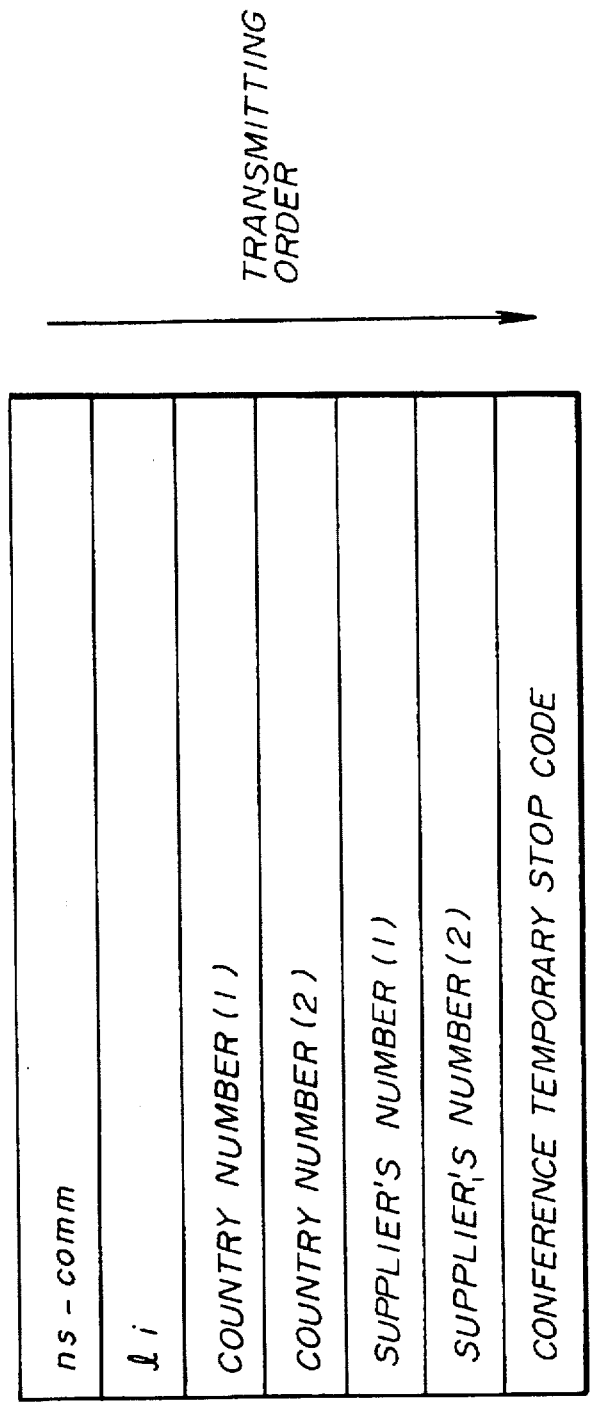
FIG. 13 is a chart of a BAS command used in the second embodiment.

FIG. 13 is a chart of the C&I signal, which is in the form of a BAS command, used in the second embodiment. The system controlling unit 1 sends the C&I signal to the opposite terminal by setting, in the MUX/DMUX controlling unit 13, a BAS code formed in a 7-byte code. The C&I signal comprises a ns-comm, li, a country number (1), a country number (2), supplier's code (1), supplier's code (2) and a conference temporary stop code, and they are sent in that order.

The ns-comm is a first byte of a command message of TTC non-standard. The li is a value of N, and the maximum number of li is 255. The country number (1) corresponds to a country number according to ITU.35 Recommendation. The country number (2) is a country number according to another Recommendation such as the Recommendation No.865 by Japanese Ministry of Posts and Telecommunications. The supplier's codes (1) and (2) are in accordance with the Recommendation No.864 by Japanese Ministry of Posts and Telecommunications announced in 1988. The conference temporary stop code represents the status of the video conference with respect to the temporary stop function by a predetermined binary expression.

As mentioned above, in the second embodiment, since the disconnecting terminal disconnects the communication line after the C&I signal, which indicates the completion of the storing operation of the files and parameters, is received from the disconnected terminal, a reliable disconnection of the communication line is achieved.

A description will now be given of a third embodiment of the video conference apparatus according to the present invention. The hardware structure of the third embodiment is the same as that of the above-mentioned first embodiment shown in FIG. 1, and thus descriptions of parts of the third embodiment that are the same as the parts shown in FIG. 1 will be omitted. It should be noted that the temporary stop state is set in the third embodiment in the same manner as that mentioned in the first and second embodiments.

Figure 14:
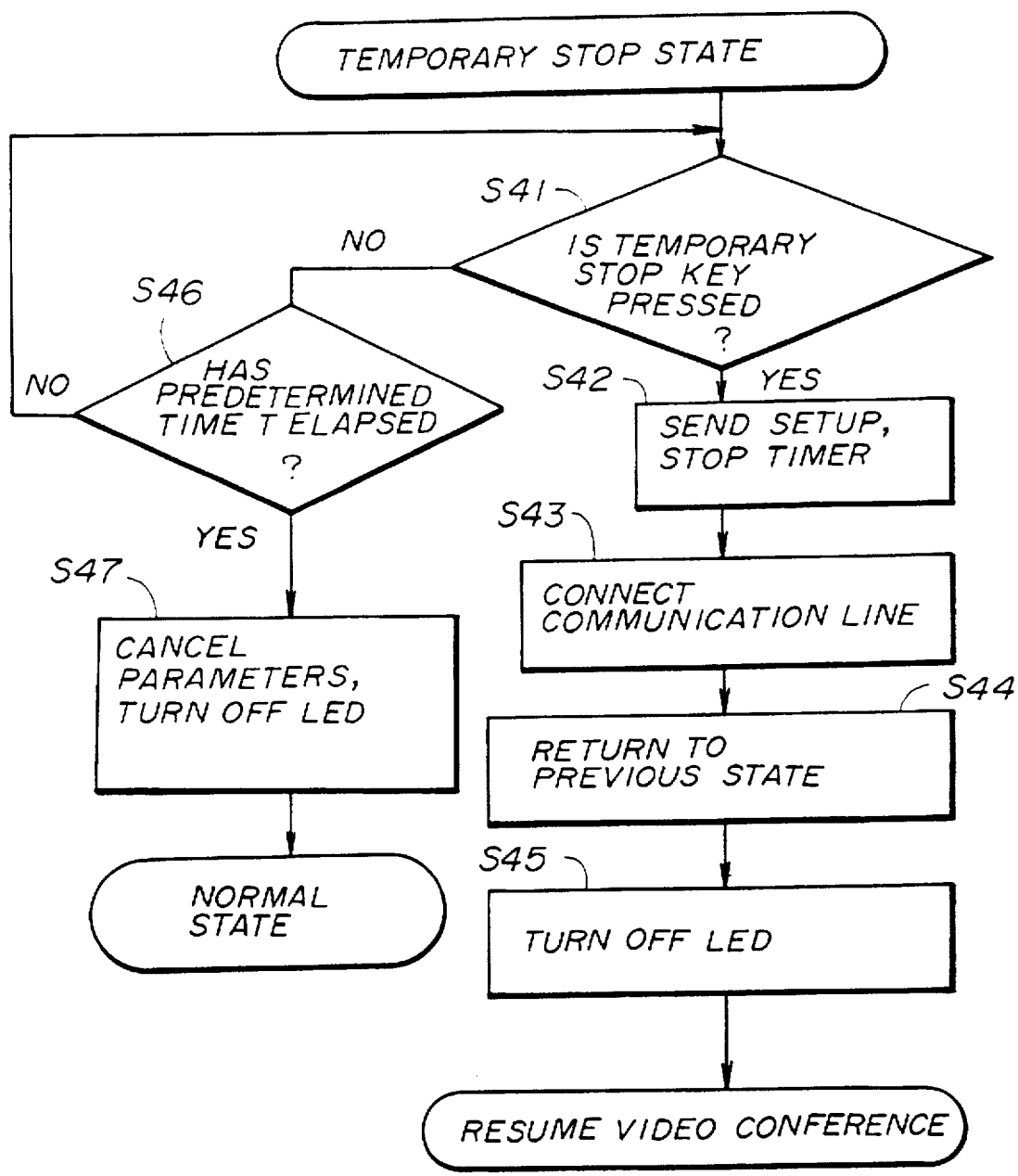
FIG. 14 is a flowchart of an operation performed by a disconnecting terminal of a third embodiment of the present invention when a video conference is resumed from a temporary stop state.

FIG. 14 is a flowchart of an operation performed by the disconnecting terminal of the third embodiment when the video conference is resumed from the temporary stop state.

In FIG. 14, it is determined, in S41, whether or not the temporary stop key is pressed to resume the video conference which is currently suspended. If it is determined that the temporary stop key is pressed, the telephone number of the opposite terminal (disconnected terminal), which telephone number was stored in the RAM unit 3 when the communication line was disconnected, is read, in S42, so as to call the disconnected terminal. The D-channel transmission controlling unit 11 sets the telephone number to the call setup message SETUP, and sends it to ISDN to call the disconnected terminal. In this step, the system controlling unit 1 stops a timing operation of a timer in the time circuit unit 4. It should be noted that the timing operation of the timer is started when the communication line is temporarily disconnected. The first channel and the additional channel are then reestablished, in S43, by following the same procedure as that mentioned in the first embodiment. The files and parameters which were stored in the magnetic disk apparatus 6 and the RAM unit 3 are then retrieved in S44, and thus the disconnecting terminal is returned to the previous state. Thereafter the LED of the operational unit 7, which LED is adjacent to the temporary stop key and was turned on when the communication line was disconnected, is turned off in S45. The video conference is then resumed.

On the other hand, if it is determined, in S41, that the temporary stop key is not pressed, the routine proceeds to S46 in which it is determined whether or not the value of the timer of the time circuit unit 4 exceeds a predetermined value T. If it is determined that the value does not exceed the predetermined value T, the routine returns to S41. If it is determined that the count value exceeds the predetermined value T, the routine proceeds to S47. In S47, the files and parameters, which are stored when the temporary stop state is set, are canceled, and the LED of the operational unit 7, which LED was turned on when the temporary stop state was set, is turned off, and thus the connecting terminal returns to a normal state.

Figure 15:
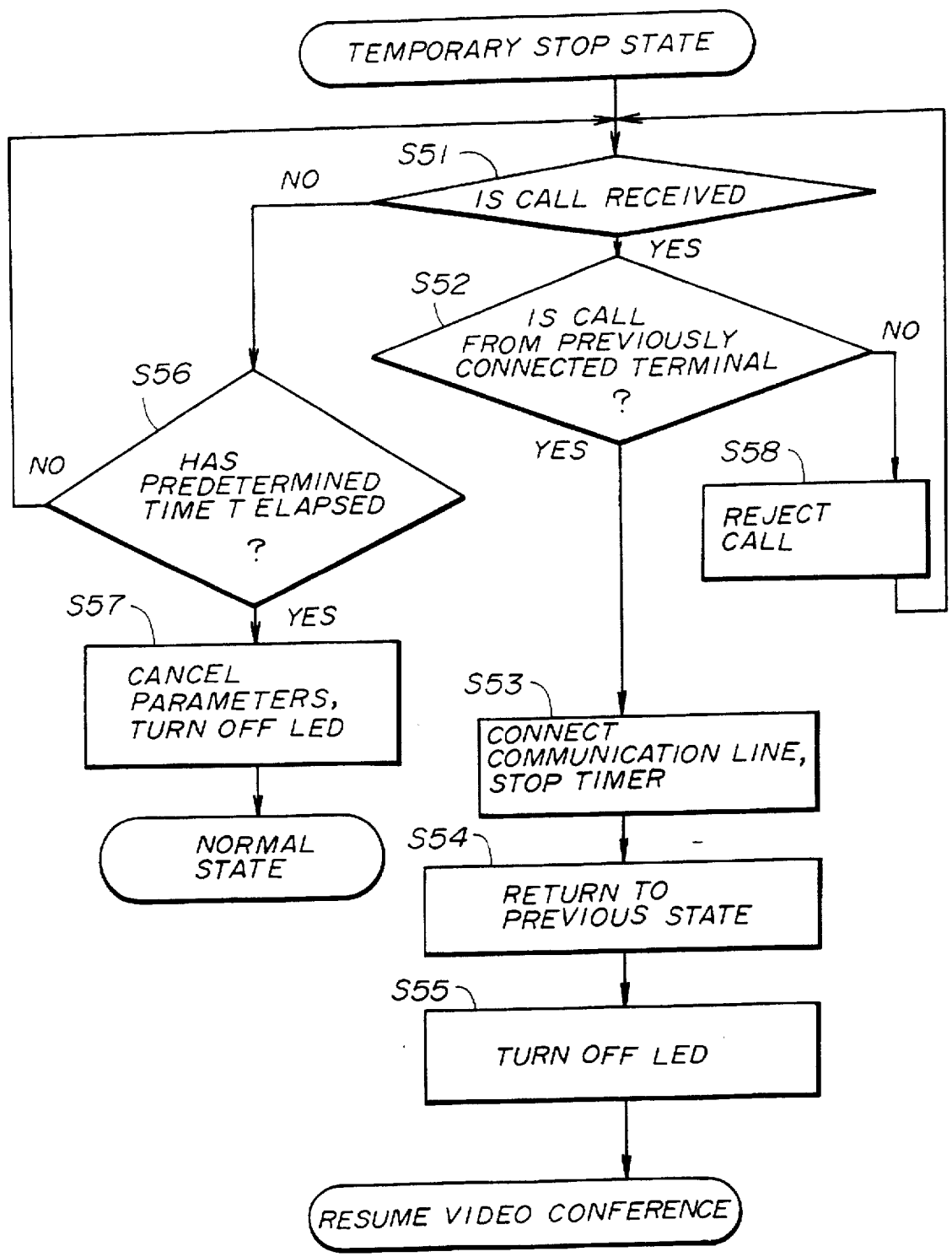
FIG. 15 is a flowchart of an operation performed by a disconnected terminal of the third embodiment when a video conference is resumed from the temporary stop state.

FIG. 15 is a flowchart of an operation performed by the disconnected terminal of the third embodiment when the video conference is resumed from the temporary stop state.

In FIG. 15, it is determined, in S51, whether or not a call setup message SETUP is received. If it is determined that SETUP is received, the routine proceeds to S52 in which it is determined whether or not the calling terminal is the disconnecting terminal to which the disconnected terminal is connected when the temporary stop state was set. This determination is made by comparing the telephone number stored in the RAM unit 3 of the disconnected terminal with the telephone number of the disconnecting terminal which telephone number is set in the received SETUP. If it is determined that the telephone numbers are different, the communication line of the received call is disconnected, in S58, by sending a disconnection message DISC to ISDN. That is, the received call is rejected. After DISC is sent, a release message is received, and then a release complete message is sent to ISDN.

On the other hand, if it is determined, in S52, that the telephone number in the RAM unit 3 is the same as the telephone number set in the received SETUP, the routine proceeds to S53 in which the system controlling unit 1 stops a timing operation of a timer in the time circuit unit 4. It should be noted that the timing operation of the timer is started when the communication line is temporarily disconnected. The first channel and the additional channel are then reestablished, in S53, by following the same procedure as that mentioned in the first embodiment. The files and parameters which were stored in the magnetic disk apparatus 6 and the RAM unit 3 are then retrieved in S54, and thus the disconnected terminal is returned to the previous state. Thereafter, the LED of the operational unit 7, which LED is adjacent to the temporary stop key and was turned on when the communication line was disconnected, is turned off in S55. The video conference is then resumed.

On the other hand, if it is determined, in S51, that no call is received, the routine proceeds to S56 in which it is determined whether or not the value of the timer of the time circuit unit 4 exceeds a predetermined value T. If it is determined that the value does not exceed the predetermined value T, the routine returns to S51. If it is determined that the value exceeds the predetermined value T, the routine proceeds to S57. In S57, the files and parameters, which are stored when the temporary stop state is set, are canceled, and the LED of the operational unit 7, which LED was turned on when the temporary stop state was set, is turned off, and thus the connecting terminal returns to a normal state in which a call from other terminals can be received.

In the above-mentioned third embodiment, a request for connecting a communication line made by the message SETUP is rejected when the telephone number stored in the RAM unit 3 is different from the telephone number set in the message SETUP, and thus the temporary stop state can be maintained even when the terminal which is set in the temporary stop state is called by other terminals.

Figure 16:
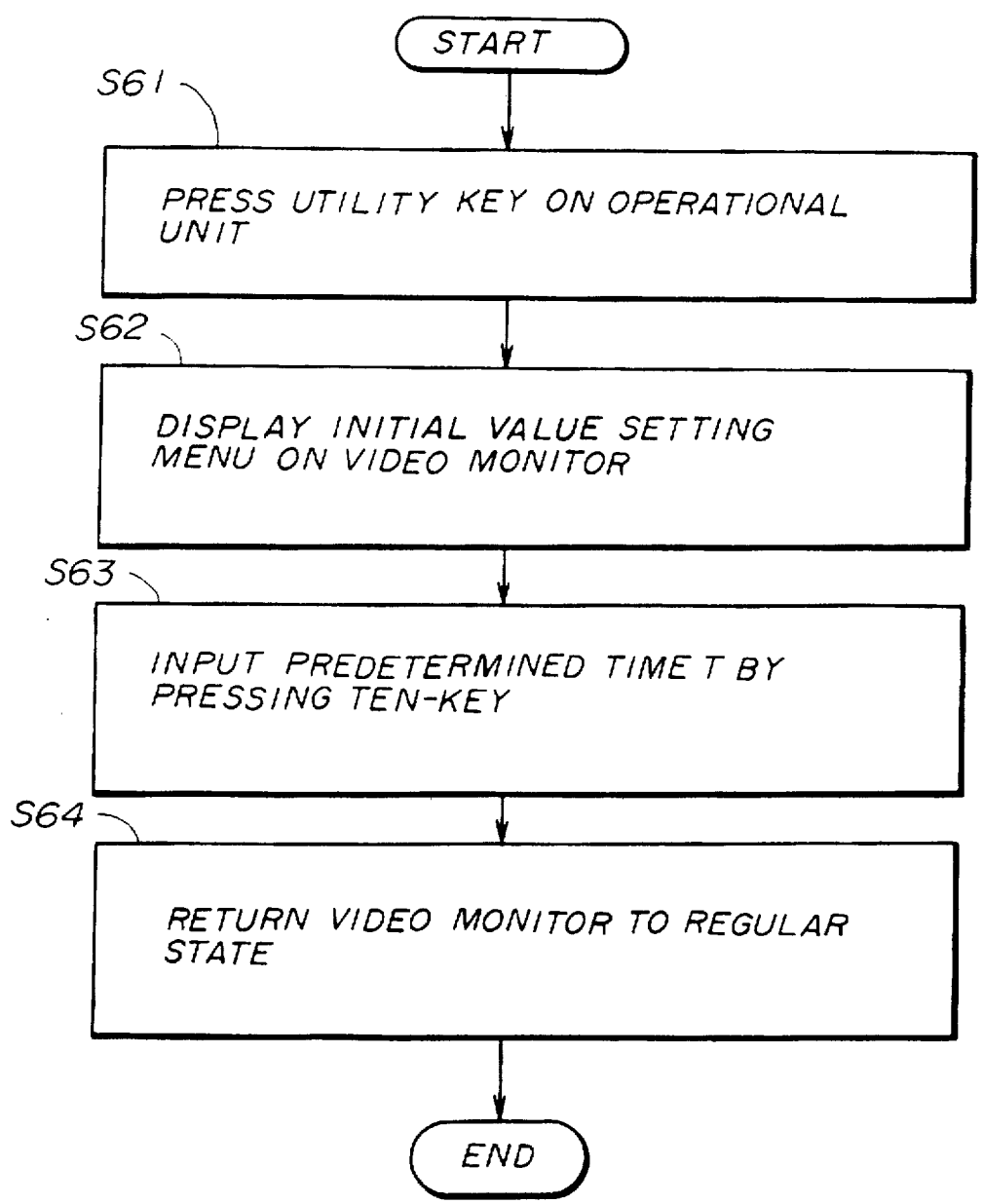
FIG. 16 is a flowchart of a setting operation of a maximum time during which the temporary stop state is maintained.

A description will now be given, with reference to FIG. 16, of a setting operation of the above-mentioned predetermined value T. FIG. 16 is a flowchart of the setting operation of the predetermined value T.

In FIG. 16, when the setting operation is started, a user presses, in S61, a utility key provided on the operational unit 7. The system controlling unit 1 then displays, in S62, an initial value setting menu on the video monitor 18 so as to request input of a maximum duration during which the temporary stop state is maintained. The user then inputs, in S63, a desired maximum value, which corresponds to the predetermined value T, by pressing the ten-keys on the operational unit 7. The display on the display monitor 18 is then returned, in S64, to a regular state, and then the setting operation is ended.

By setting the maximum time for maintaining the temporary stop state, the video conference apparatus can automatically return to a normal mode in which a call from other terminals is accepted after the predetermined time has elapsed since the video conference apparatus is set in the temporary stop state. Thus, the terminal of the video conference apparatus according to the present embodiment will never be left in the temporary stop state for a long time in which the previously connected terminal can be accessed.

The present invention is not limited to the specifically disclosed embodiments, and variations and modifications may be made without departing from the scope of the present invention.

What is claimed is:

1. A first video conference apparatus connected to communicate with at least one second video conference apparatus via a communication link so as to transmit at least audio and video data during a video conference, said first video conference apparatus comprising:

a first input inputting a temporary stop command to suspend the video conference currently being performed;

an information storing portion;

a storage control portion responsive to the received temporary stop command to control the information storing portion so as to store a present value of information regarding the video conference currently being performed when said temporary stop command is provided by said first input, said information including at least a communication parameter required for establishing the communication link;

a disconnecting control portion operating to disconnect said communication link after said temporary stop command is provided by said first input; and a notifying portion responsive to said temporary stop command transmitting a notifying message on said communication link to said at least one second video conference apparatus indicating that said temporary stop command has been input.

2. The video conference apparatus as claimed in claim 1, wherein said communication link is established on an integrated service digital network, and said notifying portion transmitted message includes a control and indication signal.

3. The video conference apparatus as claimed in claim 2, wherein said control and indication signal comprises a bit-rate allocation signal.

4. The video conference apparatus as claimed in claim 1, further comprising:

a second input inputting a cancel command which indicates that the video conference currently being suspended is to be resumed; and a connecting control portion responsive to said cancel command to control said storage control portion to recall said communication parameter from said information storage arrangement to automatically reestablish the communications link.

5. The video conference apparatus as claimed in claim 4, wherein said communication link is established on a telephone communication network, and said communication parameter comprises a telephone number of said another video conference apparatus.

6. The video conference apparatus as claimed in claim 5, wherein said connecting control portion comprises:

a sending control portion providing a call setup message to said telephone communication network so as to selectively establish a communication link with said another video conference apparatus; and a telephone number setting portion providing the telephone number recalled from storage of said another video conference apparatus in said call setup message to automatically reestablish said communication link with said another video conference apparatus.

7. A first video conference apparatus connected to communicate with at least one second video conference apparatus via a communication link on a telephone communication network so as to transmit at least audio and video data during a video conference, said first video conference apparatus comprising:

a first input inputting a temporary stop command to suspend the video conference currently being performed;

an information storing portion;

a storage control portion responsive to the received temporary stop command to control the information storing portion so as to store a present value of information regarding the video conference currently being performed when said temporary stop command is provided by said first input, said information including at least a telephone number of said at least one second video conference apparatus required for establishing the communication link;

a disconnecting control portion operating to disconnect said communication link after said temporary stop command is provided by said first input;

a second input inputting a cancel command which indicates that the video conference currently being suspended is to be resumed;

a communication link re-establishing control portion responsive to said cancel command to control said storage control portion to recall said telephone number of said at least second video conference apparatus from said information storing portion to automatically re-establish the communication link.

wherein said communication link re-establishing control portion comprises.

a sending control portion providing a call set-up message to said telephone communication network so as to selectively establish said communication link with said at least one second video conference apparatus. and a telephone number setting portion providing the telephone number recalled from storage of said at least one second video conference apparatus in said call set-up message to automatically re-establish said communication link with said at least one second video conference apparatus;

a telephone call rejecting portion rejecting a telephone call requesting establishment of a communication link with any video conference apparatus other than said at least one second video conference apparatus at least for a predetermined period of time after said communication link has been disconnected by said disconnecting control portion.

8. The video conference apparatus as claimed in claim 7, wherein a telephone number of any calling video conference apparatus is included in an inquiry call set up message as part of the telephone call requesting establishment of a communication link, and said telephone call rejecting portion further comprises:

a determining portion determining that said telephone call is not sent from said another video conference apparatus when the telephone number included in said inquiry call setup message does not match the telephone number stored by said information arrangement so that the nonmatching telephone call is rejected.

9. The video conference apparatus as claimed in claim 7, further comprising:

a timer determining that a predetermined period of time has not elapsed from the inputting of said temporary stop command;

a time period control input inputting time information which designates said predetermined period of time; and said telephone call rejecting portion being responsive to said timer to reject a telephone call from a video conference apparatus other than said another video conference apparatus only until the predetermined period of time elapses.

10. The video conference apparatus as claimed in claim 2, further comprising a separate area of said information storage arrangement controlled by said storage control portion to store at least one file currently opened and in use for the video conference when said temporary stop command is inputted.

11. The video conference apparatus as claimed in claim 10, said storage control portion further comprising:

a retrieving portion retrieving said file stored in said separate area so that the contents of said file are automatically made available for use in said video conference responsive to said communication control portion reestablishing the communication link.

12. A video conference apparatus connected to communicate with another video conference apparatus via a communication link so as to transmit at least audio and video data during a video conference. said video conference apparatus comprising:

a first input inputting a temporary stop command to suspend the video conference currently being performed;

an information storing arrangement;

a first storage control portion connected to receive the temporary stop command and to control the information storage arrangement so as to store a present value of at least one parameter used for the currently performed video conference when said temporary stop command is provided by said input;

a control portion disconnecting said communication link after said temporary stop command is provided by said first input; and a cancelling control portion cancelling the value of the parameter stored in said information storing arrangement when a predetermined time period is determined by said cancelling control portion to have elapsed after said temporary stop command is provided by said first input so that said video conference is fully terminated and the video conference apparatus is free to participate in new video conferences.

13. The video conference apparatus as claimed in claim 1. wherein the another video conference apparatus includes a receiver responsive to said notifying message for causing a control portion in said another video conference apparatus to operate and control a storage arrangement in said another video conference apparatus to store information regarding files and parameters of the video conference currently being performed at said another video conference apparatus and to transmit a storage completion message to said video conference apparatus over said communication link after completion of said storage in said another video conference apparatus;

wherein the video conference apparatus further comprises:

a completion message receiver receiving said storage completion message; and a delay portion connected to said completion message receiver and said disconnecting portion to prevent the operation of said disconnecting portion until after said storage completion message has been received by said completion message receiver.

14. A video conference system including a first video conference device connected to communicate with at least a second video conference device via a communication link that provides for the transmission and reception of at least audio and video data between each of said linked video conference devices during a video conference. each of said linked video conference devices comprising:

a first input inputting a local temporary stop command;

an information storing portion;

a storage control portion responsive to the received local temporary stop command to control the information storing portion so as to store information regarding the video conference in progress when the local temporary stop command is provided by said first input. said information being stored including at least a communication parameter for establishing a communication link;

a disconnecting control portion operating to disconnect said communications link after said local temporary stop command is provided by said first input;

a disconnect message transmitting portion responsive to the local temporary stop command and providing a disconnect message on said communication link for transmission to others of said linked video conference devices prior to the disconnection of said communication link;

a disconnect message receiving portion responsive to received disconnect messages from others of said linked video conference devices for providing a control signal to said storage control portion; and wherein said storage control portion responds to the control signal from the disconnect message receiving portion to cause the storage of at least some of the video conference information regarding files and parameters associated with the video conference in progress when said disconnect message is received.

15. A video conference system including a first video conference device connected to communicate with at least a second video conference device via a communication link that provides for the transmission and reception of at least audio and video data between each of said linked video conference devices during a video conference, wherein each of said linked video conference devices comprises:

a first input inputting a local temporary stop command;

an information storing portion;

a storage control portion responsive to the received local temporary stop command to control the information storing portion so as to store information regarding the video conference in progress when the local temporary stop command is provided by said first input, said information being stored including at least a communication parameter for establishing a communication link;

a disconnecting control portion operating to disconnect said communication link after said local temporary stop command is provided by said first input;

a disconnect message transmitting portion responsive to the local temporary stop command and providing a disconnect message on said communication link for transmission to others of said linked video conference devices prior to the disconnection of said communication link;

a disconnect message receiving portion responsive to receive disconnect messages from others of said linked video conference devices for providing a control signal to said storage control portion;

wherein said storage control portion responds to the control signal from the disconnect message receiving portion to cause the storage of at least some of the video conference information regarding files and parameters associated with the video conference in progress when said disconnect message is received; and a storage completion control portion detecting the completion of the storage of the at least some of the video conference information and transmitting a notification message indicating storage completion to at least the video conference device originating the disconnect message prior to the communication link being disconnected.

16. The video conference system as claimed in claim 15, wherein said communication link is provided over an integrated service digital network, and said notification message includes a control and indication signal.

17. The video conference system as claimed in claim 16, wherein said control and indication signal comprises a bit-rate allocation signal.

18. The video conference system as claimed in claim 14, wherein each of the linked video conference devices further comprises:

a second input inputting a cancel command;

a connecting control portion responsive to said cancel command to control said storage control portion to recall said communication parameter from said information storage arrangement to automatically reestablish the communication link.

19. The video conference system as claimed in claim 18, wherein said communication link is established on a telephone network and said at least a communication parameter for establishing the communication link includes a telephone number of any other video conference device included in the video conference.

20. The video conference system as claimed in claim 19, wherein said connecting control portion further includes:

a sending control portion providing a call setup message to said telephone communication network so as to selectively establish a communication link with at least one other video conference device; and a telephone number setting portion providing a telephone number recalled from storage of said at least one other video conference device in said call setup message to automatically reestablish the disconnected communication link.

21. The video conference system as claimed in claim 20, further comprising:

a telephone call rejecting portion rejecting any request for establishing a communication link with a video conference device other than the video conference devices identified by the telephone numbers placed in the storage arrangement.

22. The video conference system as claimed in claim 21, wherein the telephone call rejecting portion further comprises:

a comparing portion for determining if a call setup message being received contains the same telephone number as any telephone number stored in the storage arrangement.

23. The video conference system as claimed in claim 22, wherein the tel ephone call rejecting portion further comprises:

a timer responsive to the local temporary stop command for determining that a predetermined period of time has elapsed since the generation of the local temporary stop command;

a timer control input connected to a setting device for setting the predetermined period of time; and a timer output connected to said telephone call rejecting portion to disable the telephone call rejecting portion from operating upon the lapse of the set predetermined period of time.

24. The video conference system as claimed in claim 14, wherein each video conference device further comprises:

a separate portion of the information storing arrangement for storing the at least a communication parameter and video camera parameters and an archival storage portion for storing other video conference information.

25. The video conference system as claimed in claim 24, wherein said storage control portion further comprises:

a retrieval controller controlling retrieval of said other video conference information stored in said archival portion responsive to the connecting control portion operating in response to said cancelled control signal for the automatic retrieval of said other video conference information and an automatic return to video conference conditions existing at the time of the operation of the disconnecting control portion.

* * * * *